Patented Aug. 30, 1932

1,874,974

UNITED STATES PATENT OFFICE

PIETER ALFONS HAMMENECKER, OF MARIEKERKE, BELGIUM, ASSIGNOR TO THE RUBEROID CO., OF NEW YORK, N. Y., A CORPORATION OF NEW JERSEY

PROCESS FOR COLD ENAMELING ASBESTOS-CEMENT PLATES

No Drawing. Application filed November 26, 1930, Serial No. 498,437, and in Belgium December 11, 1929.

The present invention relates to cold enameling of asbestos-cement facing plates and it has for an object a process permitting of obtaining an enamel of greater hardness and of greater resistance to atmospheric agents than the enamels obtained by the usual methods.

According to a very ancient method, known under the name of "stucco-lustro", which was used particularly by the Romans in making mural frescoes, the surface to be enameled was covered with one or more layers of mortar. On the last layer while still moist, a layer consisting of a mixture of lime and powdered marble was applied and smoothed by means of spatulas, then a layer of color was applied to the lime, eventually mixed with soap, which was smoothed under heat.

This method applied to asbestos-cement plates has also given good results. However, it has been found that great care had to be exercised in carrying it out and that despite this the products did not always show the qualities of hardness and resistance to temperature changes necessary to permit of their use, more particularly as a substitute for marble.

According to the present invention, instead of using lime a cement paste is used, which paste is applied to the sheet of asbestos-cement while the latter is still in moist condition. This layer after being smoothed in the usual manner, is covered with a second coating of cement paste, which may be colored and mixed with suitable materials in order to reduce shrinkage, whereupon it is smoothed again. After the facing has hardened, the plate is exposed to an atmosphere of carbon dioxide which greatly increases its hardness and completely eliminates the production of efflorescence. If the facing is to be rendered highly resistant to acids, a composition cement known as "anti-acid" may be used in its manufacture or the surface of the cement facing may be treated with a solution of fluosilicate.

The process according to the present invention may be carried out in the following manner.

The plates of asbestos-cement are taken from the machine and while still in a moist state are placed on a suitable table, for example, of kieselguhr or other absorbent material, or upon a screen or perforated plate under which suction or vacuum is maintained. Separately one prepares a mixture of cement, coloring matter and if necessary, suitable additions to reduce shrinking or increase the hardness, for example, powdered quartz, silicates or fluosilicates. The cement may be of any suitable kind (Portland cement, aluminous cement, anti-acid cement, white cement, or the like) and a sufficient quantity of water is added to form an easily spreading paste. This paste is applied to the sheets, the excess water being absorbed by the table or evacuated between the meshes of the screen. To avoid waste the paste is prepared in a sufficient quantity so as to be used up entirely before setting has commenced.

The layer is then smoothed by means of irons or rollers, either cold or hot.

The plates are then covered with a second coating, also having a cement base, to which is preferably added fatty acids or soap in order to reduce shrinkage and to produce the desired lustre. In this coating the colors may be so distributed as to produce a great variety of designs and effects.

The plate is thereupon subjected to a further smoothing and polishing process by means of heated irons or rollers and the enamel allowed to harden.

After hardening, the plate is ready for use but it is still possible to further increase its hardness and resistance to atmospheric agents by subjecting it for several hours to the action of carbon dioxide. This process is carried out in a closed receptacle where a current of $CO_2$ is admitted.

In certain cases when the plates require a greater capacity of resistance to acids it is advisable to treat them with a solution of fluosilicate, for example, by immersion. This treatment is preferably carried out after the treatment with carbon dioxide.

Modifications in the composition of the coatings having a cement base and in the operations described above may obviously be made without departing from the scope of the invention.

What I claim is:—

1. The process of enameling an asbestos-cement plate which consists in applying a facing of cement paste to a surface of the plate while the plate is moist, polishing and hardening the facing, and then exposing the plate to the action of carbon dioxide.

2. The process of enameling an asbestos-cement plate which consists in applying a facing of cement paste to a surface of the plate while the plate is moist, polishing and hardening the facing, exposing the plate to the action of carbon dioxide, and immersing the plate in a solution of fluosilicate.

3. The process of enameling an asbestos-cement plate which consists in applying a facing of an aqueous paste having a cement base to a surface of the plate while the plate is moist, evacuating the excess water from the paste, polishing and hardening the facing, and then exposing the plate to the action of carbon dioxide.

4. The process of enameling an asbestos-cement plate which consists in applying a facing of an aqueous paste having a cement base to a surface of the plate while the plate is moist, evacuating the excess water from the paste, polishing and hardening the facing, exposing the plate to the action of carbon dioxide, and immersing the plate in a solution of fluosilicate.

Signed at Brussels, Belgium, this 14th day of November A. D. 1930.

PIETER ALFONS HAMMENECKER.